Figure 1:
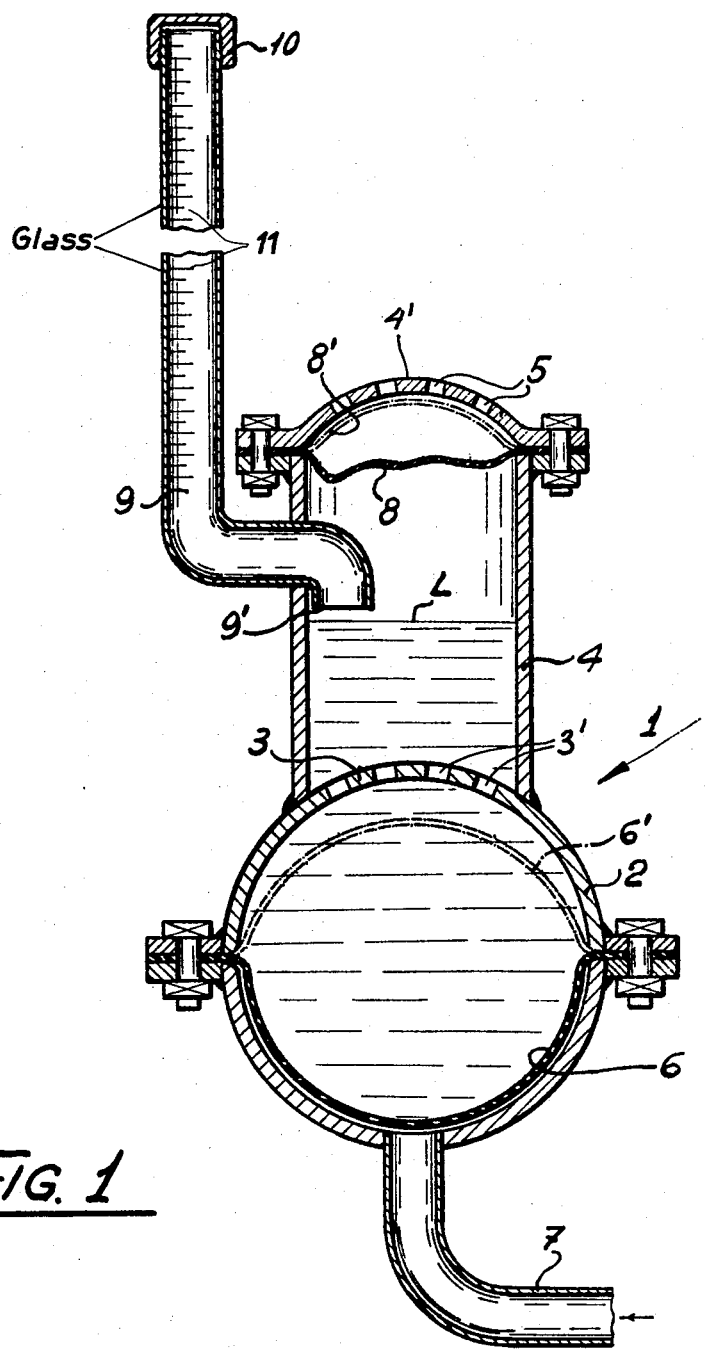

United States Patent
Capra

[15] 3,688,585
[45] Sept. 5, 1972

[54] FLUID PRESSURE GAUGE
[72] Inventor: Uberto Capra, Alte Ceccato, Vicenza, Italy
[22] Filed: Sept. 8, 1970
[21] Appl. No.: 70,123

[30] Foreign Application Priority Data
Sept. 13, 1969 Italy.....................22018 A/69

[52] U.S. Cl....................................73/406, 73/401
[51] Int. Cl..............................................G01l 7/08
[58] Field of Search......73/146.3, 406, 299, 395, 401

[56] References Cited
UNITED STATES PATENTS
785,438   3/1905   Sargent........................73/401

*Primary Examiner*—Donald O. Woodiel
*Attorney*—Karl F. Ross

[57] ABSTRACT

A gauge for measuring the air pressure in vehicular tires has a lower compartment filled with a body of water and an upper compartment normally communicating with the outer atmosphere either directly or through a slack diaphragm. An upwardly closed viewing tube calibrated in units of pressure has a lower end opening into the upper chamber above the normal water level so as to be normally vented to atmospheric pressure. An inlet port in the lower compartment is connectable to the inflated tire whereupon the entering air drives the water past the entrance end of the viewing tube and thereafter closes the upper compartment against the atmosphere (by closing a hydraulic valve or deflecting the slack diaphragm against an apertured lid) so as to prevent the escape of the water therefrom and to build up a rising counter-pressure in that compartment forcing part of the water into the tube.

10 Claims, 2 Drawing Figures

FLUID PRESSURE GAUGE

My present invention relates to a fluid-pressure gauge as used, for example, in measuring the air pressure of vehicular tires.

Gauges of this type are known in which the pressure of air or some other fluid under test displaces a column of liquid, usually water, inside a suitably calibrated and at least partly transparent viewing tube having a closed upper end, with resultant compression of a volume of trapped air in that tube by the rising liquid until the two pressures above and below the liquid body are in balance.

In such a device it is essential to vent the viewing tube to the atmosphere between successive measurements in order to compensate for possible variations in the original air volume due to, for example, leakage upon a tilting of the instrument. This zero-setting step requires the opening and closure of a separate valve, either manually or by automatic means; if the step is omitted because of human error, or imperfectly performed by reason of a malfunction, the next reading will be inaccurate.

It is, therefore, the principal object of my present invention to provide an improved pressure gauge of this general type in which the venting of the tube is an inherent consequence of the disconnection of the gauge inlet from a source of fluid under pressure previously connected thereto.

Another object is to provide means for preventing the inadvertant draining of water or other indicating liquid from a device of this nature.

A fluid-pressure gauge according to this invention has a housing divided into two compartments, i.e., a reservoir containing a body of indicating liquid (referred to hereinafter, for convenience, as water) and an air chamber communicating with this reservoir, the chamber having an outlet to the atmosphere through which its interior is normally held at atmospheric pressure. An upright viewing tube of the above-described kind has its open lower end located in the air chamber above the normal level of the water, some of which may or may not be present in that chamber at all times; thus, the viewing tube is normally empty and at the same atmospheric pressure as the air chamber from which it rises. An inlet at the reservoir is connectable to a supply of fluid under a pressure to be measured, e.g., to the nipple of an inflated automotive tire, whereby the water is displaced from the reservoir into the air chamber to an extent sufficient to rise above the lower end of the viewing tube; at that point, or shortly thereafter, a control element at the air-chamber outlet responsive to the rise in water level closes this outlet against the atmosphere to prevent the escape of water from the chamber and to start the buildup of an increasing counterpressure therein to force the water into the viewing tube whereby, eventually, the liquid column in that tube rises to a point where the air pressure in the tube and the pressure in the air chamber both equal the fluid pressure at the inlet to the reservoir.

The control element at the outlet of the air chamber may be a slack diaphragm spanning that chamber near its top which advantageously, in this case, is given the shape of an apertured dome; the diaphragm is deflectable into contact with the dome by the air trapped between it and the rising water in the chamber. It is, however, also possible to use for this purpose a hydraulic valve, e.g., one of the float-controlled type, which is closable by the water and disposed above the level of the tube entrance.

If the water reservoir is located beneath the air chamber as a lower compartment of the instrument housing, and if the volume of that reservoir substantially exceeds that of the body of water contained therein, the fluid under pressure may be admitted into the reservoir via a port disposed above the normal water level to force the water through an open-ended pipe, depending from a horizontal partition between the two compartments, into the overlying air chamber. It is, however, also possible to let the fluid under test enter the reservoir below the normal water level by providing the reservoir bottom with a flexible membrane separating the inlet port from the above-mentioned partition and supporting the body of water which, in this case, may have a volume sufficient to let some of the water normally enter the air chamber through one or more passages in that partition.

Figure 2:
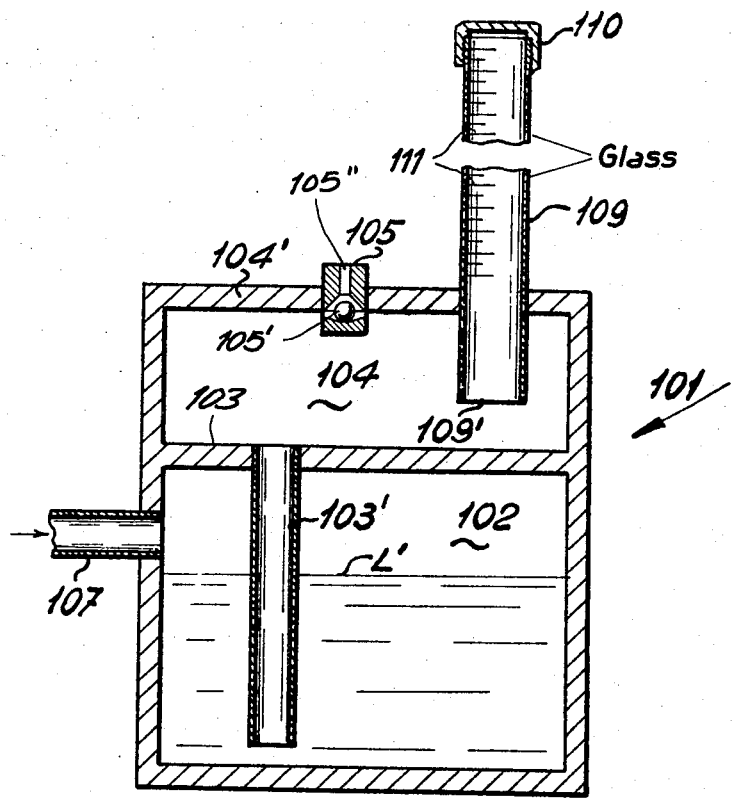

These and other features of my invention will be described in detail hereinafter with reference to the accompanying drawing in which:

FIG. 1 is a sectional elevational view of pressure gauge according to the invention; and FIG. 2 is a similar view of another embodiment.

In FIG. 1, I have shown a pressure gauge 1 with a housing forming a lower compartment 2 of spherical shape and a cylindrical upper compartment 4, the two compartments being separated by an apertured partition 3 of upwardly curved configuration formed by a cap of the sphere 2. Compartment 4 is closed at the top by a dome-shaped lid 4' having perforations 5 through which this compartment communicates with the outer atmosphere by way of a slack diaphragm 8 spanning the concave side of lid 4'. The perforations 3' of partition 3 permit a body of water in the lower compartment 2 to rise to a normal level L within air chamber 4, this level being beneath the entrance end 9' of a viewing tube 9 which has a sealed upper end 10 and which is at least partly transparent, especially in the region of a scale 11 calibrated in units of pressure such as atmospheres (gauge), kg/cm$^2$ or lb/in$^2$.

A flexible membrane 6, which may be similar to diaphragm 8 and like the latter should be impervious to water and air, normally hugs the bottom of reservoir 2 above an inlet 7 in the form of a conduit whose other end may be connectable to the nipple of an automotive tire. As long as this inlet is at atmospheric pressure, membrane 6 is deflected downwardly and diaphragm 8 occupies a floating position such as that illustrated in full lines. Tube 9 is vented under these conditions to chamber 4 which in turn is under atmospheric pressure, owing to the negligible flow resistance of diaphragm 8.

Whenever fluid under pressure is admitted through inlet 7 into the reservoir 2 beneath the membrane 6, the latter is driven upwardly into an inverted position as indicated in dot-dash lines at 6', approaching the partition 3 to a greater or less extent depending on the pressure of the fluid. The body of water supported by the member 6 rises commensurately within air chamber 4 so as to envelop the lower end 9' of tube 9; since at this point the diaphragm 8 is still free to yield upwardly, no appreciable increase in air pressure occurs above the water level in chamber 4 so that virtually no water will enter the tube 9 until the diaphragm comes to rest against the underside of dome 4' as illustrated in dot-dash lines at 8'. When this occurs, the volume of air in chamber 4 is compressed and results in a like compression of the air trapped in tube 9 as the water begins to rise therein to a mark on scale 11 representing the fluid pressure at inlet 7.

When this fluid pressure is subsequently removed, membrane 6 drops back to its original bottom position and diaphragm 8 similarly detaches itself from lid 4' to restore the original condition in which the tube 9 is vented to chamber 4.

The curving of partition 3 is designed to afford a wide range of excursion for membrane 6 without obstruction of apertures 3'. The upwardly convex shape of lid 4' serves to insure a substantially uniform engagement of its underside by a diaphragm 8 with no risk of local overstressing.

The membranes 6 and 8 may be made of rubber or other elastic material but at least membrane 6 should not be subject to elastic deformation before coming to rest against partition 3, in order not to introduce an additional force counteracting the pressure to be measured.

In the embodiment just described, both the water and the air used for pressure measurement are completely sealed against the outside so as to be protected from ambient contaminants and to retain substantially their original volume. From the foregoing description it will be understood, however, that the exact maintenance of either the water volume or the air volume is not critical and that the system will give correct readings as long as the water can close the tube entrance 9' before the diaphragm 8 loses its mobility by abutting the lid 4'.

In FIG. 2 I have shown a modified gauge in which elements analogous to those described in connection with FIG. 1 have been designated by the same reference numerals preceded by 1 in the position of the hundreds digit. Thus, the gauge 101 of FIG. 2 has a housing divided into a lower compartment 102 acting as a water reservoir and an upper compartment 104 serving as an air chamber, the two compartments being separated by a horizontal partition 103 from which a pipe 103' depends almost to the bottom of reservoir 102 to form a flow passage therethrough. Inlet 107 is disposed above the normal level L' of the water in reservoir 102 whereby part of this water is forced through pipe 103' into air chamber 104 whenever fluid under pressure is admitted through that inlet. Viewing tube 109 has its entrance end 109' located somewhat above partition 103, thus again above the normal water level.

The top 104' of air chamber 104 is provided with a hydraulic valve 105 having a float 105' which normally allows air to pass freely between this chamber and the outer atmosphere through an outlet port 105" but which blocks this port when lifted by the rising water in chamber 104. This blocking action occurs only after the water has engulfed the entrance end 109' of tube 109 so that here, too, virtually no water will enter that tube until a counter-pressure begins to build up which balances the supply pressure at inlet 107 and leads to the formation of a water column rising toward the closed end 110 of tube 109. The magnitude of this supply pressure can again be read on a suitably calibrated scale 111.

As the outlet 107 is disconnected from its fluid source, such as the tire nipple mentioned above, the water drops back to its original level L' while the valve 105 reopens communication between the atmosphere and air chamber 104, thereby venting the tube 109.

Conduit 107 may, of course, be provided with a manually or otherwise operable valve to prevent accidental spillage of water. In this embodiment, too, the exact water volume is not critical as long as the water content of the reservoir is sufficient to block the escape of air from inlet 107 via pipe 103 by keeping the lower end of that pipe inundated until valve 105 closes.

I claim:

1. A fluid-pressure gauge comprising a reservoir containing a body of liquid; an air chamber communicating with said reservoir, said chamber being provided with an outlet to the atmosphere and with flow-control means in said outlet normally maintaining the interior of said chamber at atmospheric pressure; an upright calibrated viewing tube separate from said outlet having a closed upper end and having an open lower end located in said chamber above the normal level of said liquid; and inlet means at said reservoir connectable to a supply of fluid under a pressure to be measured whereby liquid from said reservoir is displaced into said chamber and the liquid in said chamber rises to a level above said lower end, said flow-control means being responsive to a further rise in liquid level for closing said outlet against the atmosphere to initiate the buildup of a progressively increasing counterpressure in said chamber forcing some of the liquid into said tube.

2. A gauge as defined in claim 1 wherein said reservoir is disposed beneath said chamber.

3. A gauge as defined in claim 2 wherein said outlet is located at the top of said chamber.

4. A gauge as defined in claim 3 wherein said reservoir and said chamber are separated by a rigid partition provided with at least one passage for the liquid.

5. A gauge as defined in claim 4 wherein said inlet means is disposed substantially at the bottom of said reservoir, the latter being provided with a flexible membrane separating said inlet means from said partition and supporting said body of liquid.

6. A gauge as defined in claim 5 wherein said partition is upwardly curved.

7. A gauge as defined in claim 4 wherein said reservoir has a volume larger than that of said body of liquid, said inlet means being disposed above the normal liquid level, said passage being formed by an open-ended pipe depending from said partition to almost the bottom of said reservoir.

8. A gauge as defined in claim 3 wherein the top of said chamber is an apertured dome, said flow-control means comprising a slack diaphragm spanning said chamber below said dome, said diaphragm being deflectable into contact with said dome by the air trapped in said chamber between said diaphragm and the rising liquid.

9. A gauge as defined in claim 3 wherein said flow-control means comprises a hydraulic valve closable by said liquid and disposed above the level of said open lower end.

10. A gauge as defined in claim 3 wherein said tube rises substantially above the level of said outlet.

* * * * *